United States Patent
Mogi

(10) Patent No.: US 6,836,631 B2
(45) Date of Patent: Dec. 28, 2004

(54) IMAGE FORMING APPARATUS IN WHICH LEADING END PART OF OPTICAL UNIT IN MOUNTING DIRECTION IS PRESSED AND FIXED BY ELASTIC MEMBER

(75) Inventor: Shin Mogi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/267,868

(22) Filed: Oct. 10, 2002

(65) Prior Publication Data

US 2003/0081963 A1 May 1, 2003

(30) Foreign Application Priority Data

Oct. 25, 2001 (JP) .................................. 2001-327640

(51) Int. Cl.$^7$ .................. G03G 15/04; G03G 21/16; B41J 2/44; G02B 26/10
(52) U.S. Cl. .................. 399/118; 347/138; 347/257
(58) Field of Search .................. 347/257, 138, 347/152, 245, 263; 399/118; 359/196

(56) References Cited

U.S. PATENT DOCUMENTS

| | | | |
|---|---|---|---|
| 5,001,499 A | * 3/1991 | Waragai et al. | 347/138 |
| 5,063,409 A | 11/1991 | Nakajima | 355/200 |
| 5,751,431 A | * 5/1998 | Taka et al. | 399/118 |
| 6,236,820 B1 | * 5/2001 | Nakazato et al. | 399/111 |

FOREIGN PATENT DOCUMENTS

| | | |
|---|---|---|
| JP | 58-078172 | 5/1983 |
| JP | 04-261564 | 9/1992 |

* cited by examiner

Primary Examiner—John Pendegrass
(74) Attorney, Agent, or Firm—Fitzpatrick, Cella, Harper & Scinto

(57) ABSTRACT

An image forming apparatus including: an image bearing member; an optical unit for image exposure of the image bearing member, the optical unit being mountable from a side of the apparatus main body; and an elastic member for pressuring the optical unit downward.

7 Claims, 4 Drawing Sheets

IMAGE FORMING APPARATUS IN WHICH LEADING END PART OF OPTICAL UNIT IN MOUNTING DIRECTION IS PRESSED AND FIXED BY ELASTIC MEMBER

BACKGROUND OF THE INVENTION

1. Field of the Invention

The present invention relates to an image forming apparatus using an electrophotographic process, such as a copying machine and a printer.

2. Related Background Art

FIG. 5 is a cross-sectional view of an image forming apparatus. As shown in FIG. 5, in a conventional image forming apparatus 30, a photosensitive drum 38 is provided inside the apparatus. A charger 35 and a developing unit 36 are provided adjacently around the photosensitive drum 38. Moreover, a transfer unit 37 and a fixing device 40 are disposed around the photosensitive drum 38.

Moreover, a light scanning unit 10 is provided in the vicinity of to the photosensitive drum 38. Furthermore, a sheet of paper 42, and feed and transport rollers 43, 44, 45 capable of successively transporting the sheet of paper 42 are provided below the photosensitive drum 38. Moreover, an image information controller 33 and a reader unit 32 capable of reading an original are provided above the photosensitive drum 38 in an upper part of the image forming apparatus 30.

The light scanning unit 10 provided in the image forming apparatus 30 is for writing on the photosensitive drum 38 using a laser beam. FIG. 6 is a schematic diagram of a side inner part of the light scanning unit 10.

As shown in FIG. 6, the light scanning unit 10 has a structure contained in an optical box 20. That is, the light scanning unit 10 comprises a semiconductor laser as the light source, a collimator lens and a cylinder lens (not shown), a polygon mirror 19, scanning lenses 21, 22, turn-back mirrors 25, 26, 27, a lengthy cylinder lens 29, and an irradiation window 28 in the optical box 20.

Moreover, a laser beam through inside the light scanning unit 10 shown in FIG. 6 is first outputted from the semiconductor laser, collimated by the collimator lens so as to be inputted in the polygon mirror 19, and deflected by the polygon mirror 19. Then, the laser beam passes through inside the optical box 20 so as to be reflected successively by the turn-back mirrors 25, 26. Accordingly, the laser beam is reflected so as to pass through the optical parts in the upper and lower two spaces inside the optical box 20.

The light scanning unit 10 with the above-mentioned configuration is mounted on a frame provided in the image forming apparatus 30 with a high accuracy.

The above-mentioned light scanning unit 10 is replaced per unit due to the life of the parts such as exhaustion of the parts in the market. For the unit replacement, the unit can be replaced after detaching the constituent parts such as the reader unit 32 provided in the main body upper part of the image forming apparatus 30, or the unit can be replaced by sliding and moving from the side of the image forming apparatus 30 without detaching the constituent parts such as the reader unit 32 in the main body upper part.

In the case of the unit replacement after detaching the constituent parts such as the reader unit 32 in the main body upper part in the former case, since the upper part of the image forming apparatus 30 can be opened, the light scanning unit 10 can be fastened using a screw or the like from above. Thereby, the light scanning unit 10 can be fixed stably.

In contrast, in the case of the unit replacement without detaching the constituent parts such as the reader unit 32 in the main body upper part in the latter case, as shown in FIG. 6, an auxiliary part 49 is mounted preliminarily on the light scanning unit 10.

Then, the light scanning unit 10 is guided to a predetermined position in the main body using a rail (not shown) provided in the main body. After abutting against the auxiliary part 49 with a main body fitting part 50 by the guiding operation, the auxiliary part 49 is forced against the main body fitting part 50 sideways using a fixing member such as a screw 51. Thereby, the light scanning unit 10 is provided without movement particularly in the horizontal direction.

However, according to the former method of the two kinds of the detaching and replacing methods for the above-mentioned light scanning unit 10, since all the constituent parts such as the reader unit 32 are detached, excessive labor and long time are required, and thereby the unit replacement itself is extremely inefficient.

In contrast, according to the latter method, the light scanning unit 10 is attached/detached while sliding from the side of the main body without detaching the reader unit 32. In the case of this method, since the light scanning unit 10 can move to a considerably deep part of the main body inside and the reader unit 32 is not detached, it is difficult to fix the light scanning unit 10 from above by a screw or the like.

Furthermore, the light scanning unit 10 is disposed only by abutting in the lateral direction so as to be stabilized using the gravitational force of the light scanning unit 10. Therefore, the close contact property of the light scanning unit 10 to the installation part at the time of fixing is low.

Thereby, an adverse effect is provided to the image quality due to generation of backlash derived from the vibration generated from the light scanning unit 10 itself or the image forming apparatus 30 main body and generation of the error of the installation accuracy itself.

SUMMARY OF THE INVENTION

Accordingly, an object of the present invention is to provide an image forming apparatus capable of mounting an optical unit from sideways.

Another object of the present invention is to provide an image forming apparatus with a high stability in an optical unit.

A still another object of the present invention is to provide an image forming apparatus comprising:

an image bearing member;

an optical unit for image exposure of the image bearing member, the optical unit being mountable from sideways of the apparatus main body; and an elastic member for pressuring the optical unit downward.

A further object of the present invention will be apparent by the explanation provided below.

DESCRIPTION OF THE PREFERRED EMBODIMENTS

Hereinafter, embodiments of the present invention will be explained with reference to the accompanied drawings.

(First Embodiment)

Figure 1:
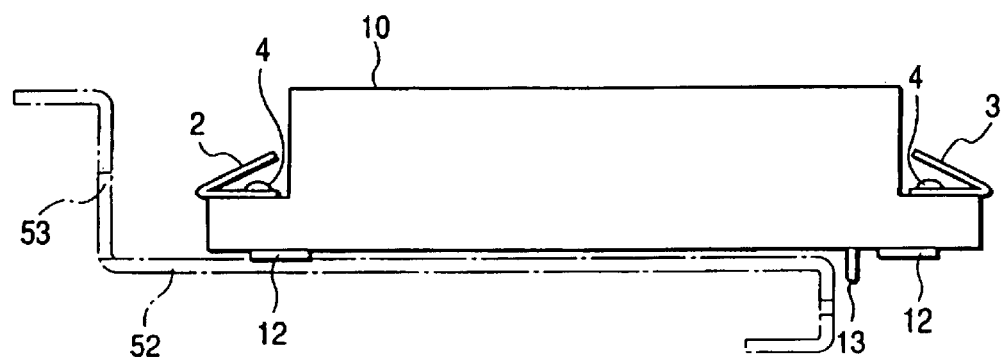
FIG. 1 is a side view showing a state before installation of a light scanning unit according to a first embodiment of the present invention.
Figure 2:
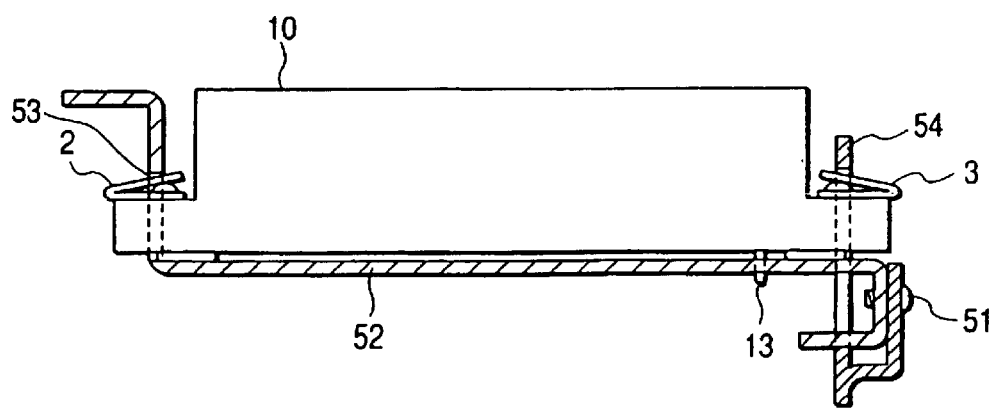
FIG. 2 is a side view showing a state at the time of the installation of the light scanning unit according to the first embodiment of the present invention.
Figure 3:
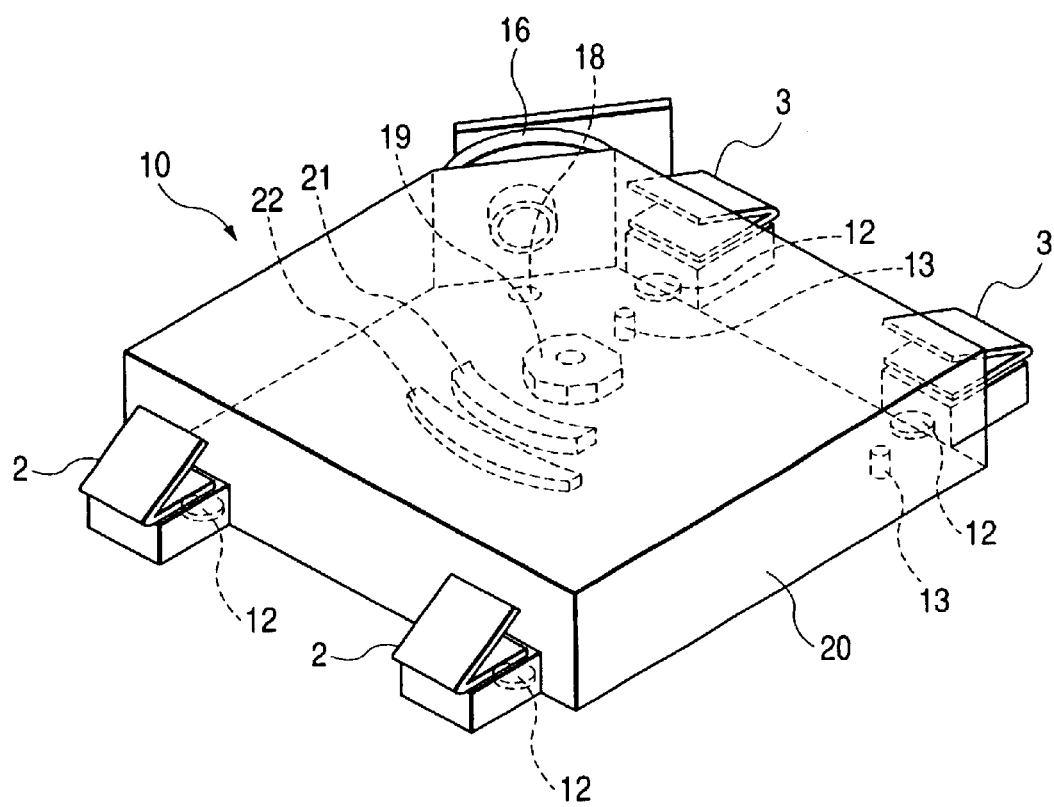
FIG. 3 is a perspective view of the light scanning unit according to the first embodiment of the present invention.

First, a light scanning unit (optical unit) 10 inside an image forming apparatus according to a first embodiment of the present invention will be explained. FIGS. 1 and 2 show the light scanning unit and a reference stay in the image forming apparatus, and FIG. 3 is a perspective view of the light scanning unit. The light scanning unit according to the first embodiment is to be attached/detached by moving in the lateral direction with respect to the inside of the image forming apparatus 30 while being contained in the image forming apparatus 30.

As shown in FIG. 1, according to the light scanning unit 10 of the first embodiment, elastic members 2, 3 are provided integrally each on the both end parts. Moreover, a reference foot 12 and a reference pin 13 are provided in a part on a side opposite to a side on which the elastic members 2, 3 are mounted in the light scanning unit 10.

The elastic member 2 comprises a spring having a shape with a plate-like metal piece bent halfway. Moreover, one side of the bent parts of the elastic member 2 is fastened to the light scanning unit 10 by a mounting screw 4. In FIG. 1, the elastic members 2, 3 are not pressured from the outside so that a natural state with a large open angle is shown.

Furthermore, the light scanning unit 10 is provided so as to be mounted on a stay fixed on the image forming apparatus 30, that is, a main body reference stay 52. The main body reference stay 52 is for fixing by fitting one end of the light scanning unit 10 in a fitting hole 53 formed in a part thereof. Thereby, a standard installation part for the light scanning unit 10 can be provided.

Moreover, the main body reference stay 52 is provided with the position accuracy with respect to the photosensitive drum of the image forming apparatus 30 (not shown in FIG. 1) ensured.

Furthermore, FIG. 2 shows a state with the light scanning unit 10 slid on the main body reference stay 52 and moved to a standard position so that the light scanning unit 10 is installed at the standard installation part.

As shown in FIG. 2, in the state with one end of the light scanning unit 10 disposed at the standard installation portion on the main body reference stay 52, the side of the light scanning unit 10 provided with the elastic member 2 is inserted in the fitting hole 53. At this time, the elastic member 2 is pressured at the end part having the fitting hole 53 so as to be compressed with the open angle reduced.

According to the compression, the light scanning unit 10 is forced downward continuously so as to be contacted closely with the main body reference stay 52 in FIG. 2. Here, the pressuring force by each elastic member 2 is preferably two times or more as much as the mass of the light scanning unit 10 regarded as equivalent to the pressuring force in order to avoid the influence of the vibration of the light scanning unit 10.

In the pressured state, the part below the pressured position is in the vicinity of the reference foot 12 so that stress is not generated largely in the lateral direction with respect to the pressure applied perpendicularly in the vicinity of the reference foot 12. Thereby, displacement in the lateral direction can hardly be generated as well as the accuracy in the height direction can be ensured by accordance of the reference foot 12 with the accuracy surface of the main body reference stay 52.

Moreover, the final position at the time of moving the light scanning unit 10 is determined by coupling the reference pin 13 as a fitting pin with a fitting hole (now shown) provided in the main body reference stay 52. The light scanning unit 10 is moved while searching the fitting position of the reference pin 13 with one side thereof lifted up.

That is, specifically, as shown in FIG. 3, the light scanning unit 10 comprises a polygon mirror 19 as a deflecting means, and scanning lenses 21, 22 provided in an optical box 20 having a rectangular parallelepiped shape with one corner cut off. Moreover, two of the above-mentioned elastic members 2 and 3 are provided at each of the opposite side parts of the optical box 20.

Furthermore, the reference feet 12 are provided on the lower surface of the optical box 20 in the vicinity of the elastic members 2, 3. Moreover, the two reference pins 13 are provided on the lower surface of the optical box 20 in the vicinity of the two elastic members 3.

Furthermore, a cylinder lens 18 is provided in the vicinity of the inner side of the part with the cut off shape of the optical box 20 as well as a laser unit 16 as the light source is provided on the outer side thereof.

The light scanning unit 10 is moved by determining the installation position and positioning by fitting the above-mentioned two reference pins 13 so as to be positioned each at a predetermined hole in the main body reference stay 52. The positioning operation is executed using the two reference pins 13 without using the elastic members 2 themselves for positioning.

Moreover, as shown in FIG. 2, according to the first embodiment, an engaging auxiliary member 54 with a fitting hole (not shown) provided on the inner side is used for certain fixation without movement after the installation of the light scanning unit 10 so as to clamp the elastic members 3 having the same configuration as that of the elastic members 2 and the end part of the main body reference stay 52.

Thereby, the elastic members 3 and the main body reference stay 52 are clamped so as to be pressured, and engaged by a screw 51 so as to be fixed.

Moreover, as mentioned above, in general, the lower surface of the light scanning unit 10 is installed on the stay, that is, by the so-called lower surface installation. Furthermore, the light scanning unit 10 is moved in the inside of the image forming apparatus 30 to be installed by the lateral sliding method with respect to the image forming apparatus 30. It is also possible to provide a guide part for preventing displacement on a part of the main body reference stay 52, taking the lateral sliding method into consideration.

Moreover, unlike the light scanning unit 10 of the first embodiment, also in the case of a light scanning unit with the parts such as the turn-back mirror provided partially at the outside, the configuration of the above-mentioned first embodiment can be adopted so as to achieve the same effect as that of the first embodiment.

As heretofore explained, according to the light scanning unit in the image forming apparatus according to the first embodiment, since the elastic members 2, 3 are provided integrally, the elastic members 2, 3 can be deformed rationally without disturbing the movement of the light scanning unit 10 in the lateral direction in a simple configuration and they can be fixed certainly in the image forming apparatus as well as the elastic members 2 to be taken out integrally at the time of replacing the light scanning unit 10 can be replaced outside the image forming apparatus, deterioration derived from a long term pressure application can be reduced so that deterioration of the pressuring force due to the elastic deformation of the elastic members 2, that is, the so-called wear-out (permanent set in fatigue) can be prevented so that a higher reliability can be ensured.

(Second Embodiment)

Next, a light scanning unit 10 of an image forming apparatus according to a second embodiment of the present invention will be explained. FIGS. 4A, 4B, 4C and 4D are schematic diagrams of the part of the light scanning unit 10 provided with an elastic member according to the second embodiment. Since the other parts and the numerals thereof are same as those of the first embodiment, further explanation is not provided.

Moreover, although an embodiment with the elastic members 2, 3 comprising leaf springs in the light scanning unit 10 has been explained in the first embodiment, other embodiments of the elastic members 2, 3 and modified embodiments thereof will be explained in the second embodiment.

Figure 4A:
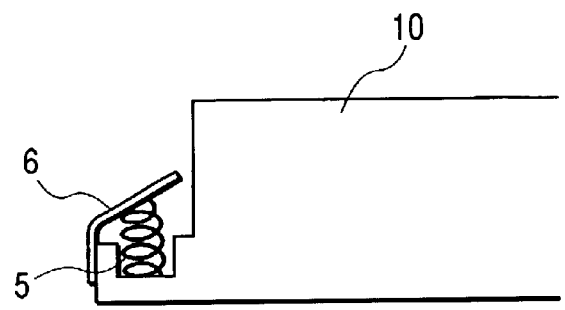
FIGS. 4A, 4B, 4C, and 4D are side views showing light scanning units having various kinds of elastic members according to a second embodiment of the present invention.

First, FIG. 4A shows an embodiment of the elastic member comprising a coil spring 5 and a contact plate 6 provided integrally with the side part of the light scanning unit 10 of the second embodiment.

That is, the coil spring 5 is provided in a stepped portion in the side part of the light scanning unit 10 such that the repulsive force is generated in the direction perpendicular to the direction of laterally sliding the light scanning unit 10 as in the first embodiment.

Moreover, there is provided the contact plate 6 bendable in the direction of compressing the coil spring 5. Thereby, as in the light scanning unit 10 of the first embodiment, it is contacted partially with the main body reference stay 52 so as to receive the pressuring force in the vertical direction (gravity direction) as in the light scanning unit 10 of the first embodiment. As needed, the elastic members may comprise only the coil spring 5 without providing the contact plate 6 in the elastic members.

However, since the contact plate 6 is provided at the end part of the light scanning unit 10 so as to be contacted with the end part of the coil spring 5, at the time of sliding the light scanning unit 10 along the main body reference stay 52 for fitting the part of the elastic member with the fitting hole 53 formed in the main body reference stay 52, the fitting operation can be executed while being guided by the contact plate 6 so that the coupling of the elastic member with the fitting hole 53 can be facilitated.

Figure 4B:
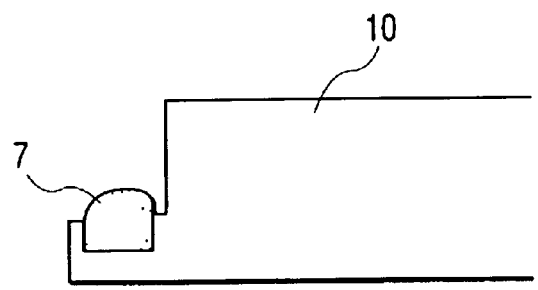

Next, FIG. 4B shows an embodiment of the elastic member comprising a rubber member 7 provided integrally with the side part of the light scanning unit 10 of the second embodiment.

That is, the elastic member is provided by selectively providing a recess part in the stepped portion at the side part such that the repulsive force is generated in the direction perpendicular to the direction of inserting the light scanning unit 10, and fitting the rubber member 7 into the recess part. Thereby, the light scanning unit 10 can be moved along the main body reference stay 52 so that the light scanning unit 10 is pressured by the elastic force of the rubber at the time it is placed at a predetermined position so as to be fixed on the main body reference stay 52.

Figure 4C:
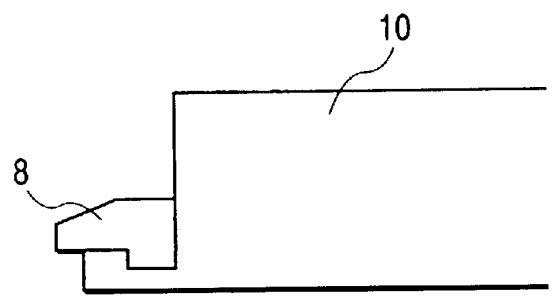

Moreover, FIG. 4C shows an embodiment of the elastic member comprising a synthetic resin member 8 provided integrally with the side part of the light scanning unit 10 of the second embodiment.

The synthetic resin member 8 itself is provided elastically deformably. Therefore, by fitting the elastic member comprising the synthetic resin member 8 in the fitting hole 53 in the main body reference stay 52, the pressuring force is generated so that the light scanning unit 10 can be engaged thereby.

The synthetic resin member 8 is mounted on the light scanning unit 10 basically by bonding with a material of another composition or by screwing. In contrast, the optical box 20 configuring the light scanning unit 10 is made of a synthetic resin in most cases. Therefore, the elastic member can be produced also by the so-called two color molding of molding simultaneously with a synthetic resin material of another kind with a high elastic modulus.

Figure 4D:
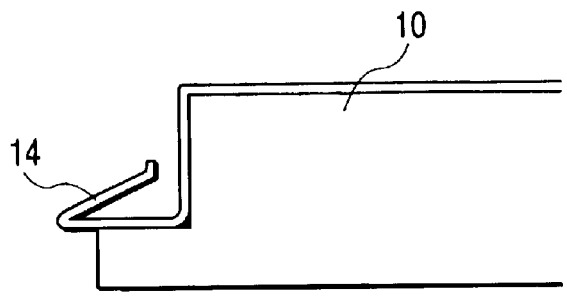
Figure 5:
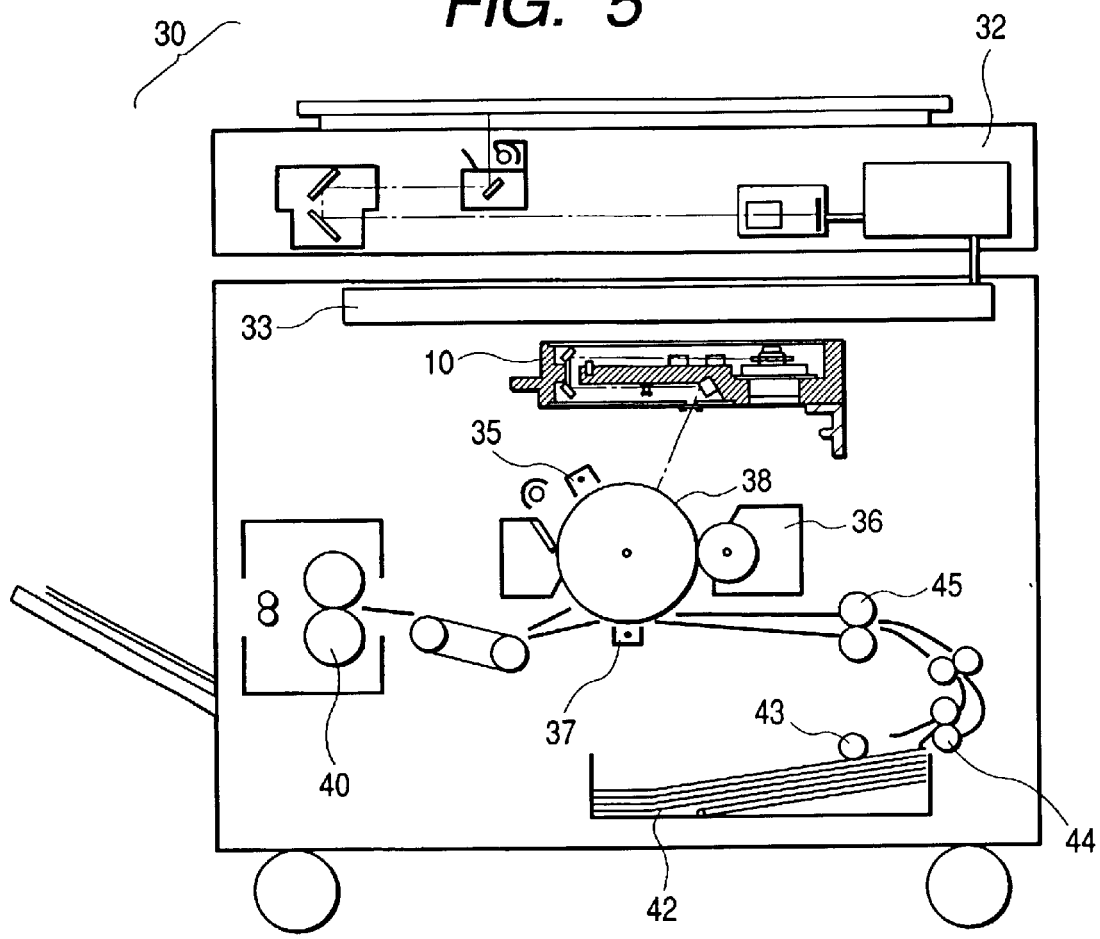
FIG. 5 is a schematic diagram showing an image forming apparatus.
Figure 6:
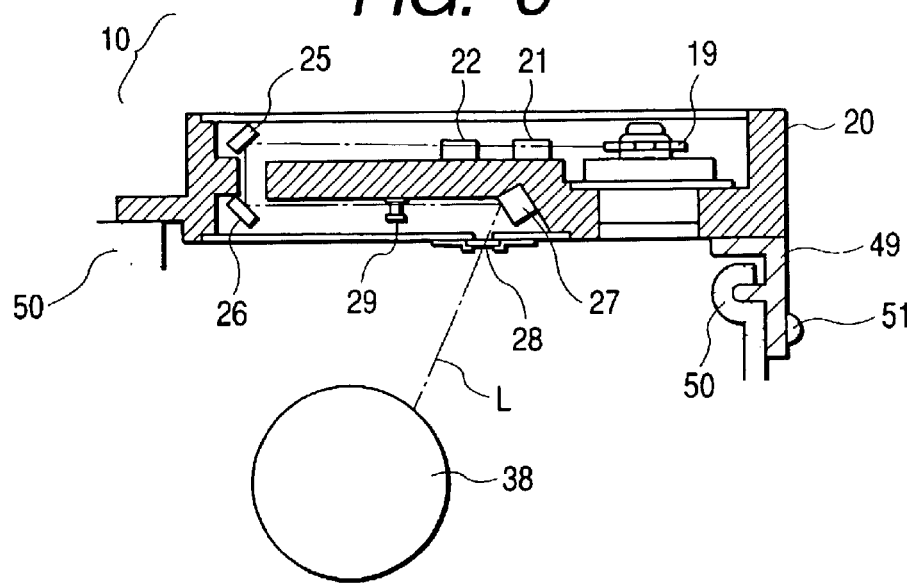
FIG. 6 is a schematic diagram showing a light scanning unit and a photosensitive drum.

Moreover, FIG. 4D shows an embodiment of the elastic member comprising a bent metal plate provided integrally with the side part of the light scanning unit 10 of the second embodiment.

That is, the elastic member according to the second embodiment is provided by bending a metal extended plate 14 as an extended part of the lid of the optical box 20 to the inside of the light scanning unit 10 like the elastic members 2, 3 of the first embodiment.

The extended plate 14 is provided integrally with the lid comprising a sheet metal used in general in contact with the optical box 20. Moreover, the lid attached on the optical box 20 for avoiding the dusts is mounted with a screw, or the like in most cases for ensuring the dust avoiding effect.

By accordingly using the extended part of the lid mounted on the optical box 20 for avoiding the dusts as the elastic member, since the elastic member need not be provided additionally, the number of parts used for the light scanning unit 10 can be reduced as well as the number of steps of labor can be cut back.

As heretofore explained, in the second embodiment, embodiments of the elastic member as a coil spring, a rubber, a synthetic resin, or the like other than the plate spring, and addition of a function to the existing part have been described.

Since the various kinds of the elastic members are mounted integrally with the light scanning unit 10 and used, movement of the light scanning unit 10 in the lateral direction is not disturbed, and they are used in a form deformable according to the movement of the light scanning unit. Therefore, the same effect as in the first embodiment can be obtained. Thereby, the methods of the elastic members may be used partially in a combination.

Furthermore, it is also possible to use the elastic member only in the one side of the light scanning unit 10 and mount the other side with a screw and an auxiliary part without using the elastic member. The structure depends also on the installation state of the light scanning unit 10 in the main body of the image forming apparatus 30 so that the above-mentioned structures can be selected with reference to the operativity, such as the case capable of easily fastening on one side of the light scanning unit 10.

Moreover, since the freedom in the selection of the elastic member can be widened, the direction of attaching/detaching the light scanning unit 10 on/from the main body of the image forming apparatus 30 can be selected optionally. Therefore, depending on the convenience in terms of the configuration of the main body of the image forming apparatus 30 or the shape of the light scanning unit 10, the direction of sliding and moving with respect to the stay can be determined.

Furthermore, since freedom of selection of the elastic member for the light scanning unit 10 can be widened by adopting the elastic member of the second embodiment, freedom of the parts layout in the main body can be increased as well as the light scanning unit 10 can be provided in further simple structure and is easily and detachably mountable.

Although the embodiments of the present invention have been described specifically, the technological scope of the present invention is not limited by the size, the material, the shape and the relative arrangement of the constituent parts mentioned in the embodiments unless specific description thereof is provided.

Although an embodiment of a copying machine as the image forming apparatus has been provided in the above-mentioned embodiments, it is not limited thereto, and the present invention can be adopted to those comprising a sliding type attachable/detachable light scanning unit such as a printer, a facsimile, a full color copying machine and a monochrome copying machine.

As heretofore explained, according to the image forming apparatus of the present invention, since the elastic member is provided integrally with at least a part of the light scanning unit provided detachably by moving in a predetermined direction, the light scanning unit in the image forming apparatus can be attached/detached easily at the time of attaching/detaching the same by the sliding method as well as the light scanning unit can be closely contacted and fixed with a predetermined position stably. Thereby, the performance of the light scanning unit can be provided sufficiently so that a good writing image quality can be ensured.

Although the embodiments of the present invention have been explained, the present invention is not limited thereto, and various modifications can be applied without the technological idea.

What is claimed is:

1. An image forming apparatus comprising:

an image bearing member;

an optical unit for image exposure of said image bearing member, said optical unit being mountable from a side of a main body of said image forming apparatus; and an elastic member for pressuring said optical unit in a direction substantially perpendicular to a mounting direction of said optical unit by pressing a leading end part of said optical unit, the leading end being determined with respect to the mounting direction.

2. The image forming apparatus according to claim 1, wherein said elastic member fixes said optical unit mounted at a predetermined mounting position by applying a pressuring force.

3. The image forming apparatus according to claim 2, wherein the pressuring force is generated by elastic deformation of said elastic member when said optical unit is disposed in the mounting position.

4. The image forming apparatus according to claim 1, wherein said elastic member is provided on the leading end part of said optical unit.

5. The image forming apparatus according to claim 1, wherein said optical unit comprises a laser beam source, deflecting means for deflecting a laser beam outputted from said laser beam source, and an imaging lens for imaging the laser beam on said image bearing member.

6. An image forming apparatus comprising:

an image bearing member;

an optical unit for image exposure of said image bearing member, said optical unit being mountable from a side of a main body of said image forming apparatus; and an elastic member for pressuring said optical unit downward, wherein a pressuring force of said elastic member is two times or more as much as a mass-force of said optical unit.

7. The image forming apparatus according to claim 5, wherein said optical unit comprises a laser beam source, deflecting means for deflecting a laser beam outputted from said laser beam source, and an imaging lens for imaging the laser beam on said image bearing member.

* * * * *